United States Patent
Sevindik

(10) Patent No.: US 9,596,696 B1
(45) Date of Patent: Mar. 14, 2017

(54) SYSTEMS AND METHODS FOR DETERMINING BROADCAST PARAMETERS FOR AN AREA

(71) Applicant: Sprint Spectrum LP, Overland Park, KS (US)

(72) Inventor: Volkan Sevindik, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 133 days.

(21) Appl. No.: 14/452,927

(22) Filed: Aug. 6, 2014

(51) Int. Cl.
- *H04H 20/71* (2008.01)
- *H04W 72/08* (2009.01)
- *H04W 64/00* (2009.01)
- *H04W 72/04* (2009.01)

(52) U.S. Cl.
CPC ....... *H04W 72/085* (2013.01); *H04W 64/006* (2013.01); *H04W 72/048* (2013.01)

(58) Field of Classification Search
CPC H04W 72/085; H04W 64/006; H04W 72/048
USPC ....... 370/252, 312, 241, 254, 253, 328, 329, 370/330
See application file for complete search history.

(56) References Cited

U.S. PATENT DOCUMENTS

| | | | | |
|---|---|---|---|---|
| 9,319,722 | B2* | 4/2016 | Song | H04L 65/4038 |
| 2010/0285826 | A1* | 11/2010 | Bourdeaut | H04L 1/0003 455/513 |
| 2010/0290407 | A1* | 11/2010 | Uemura | H04W 74/0866 370/329 |
| 2012/0170501 | A1 | 7/2012 | Drozt et al. | |
| 2012/0213099 | A1* | 8/2012 | Cheng | H04L 1/0003 370/252 |
| 2012/0269110 | A1 | 10/2012 | Walker et al. | |
| 2014/0126456 | A1* | 5/2014 | Song | H04N 21/6405 370/312 |

* cited by examiner

*Primary Examiner* — Chuong T Ho

(57) ABSTRACT

Systems and methods are described for determining a broadcast transmission scheme for an area. Channel quality indicators may be received from a plurality of wireless devices. For each of the plurality of wireless devices, a location may be determined. A geographic area may be classified as a first broadcast classification based on the channel quality indicators received from wireless devices that comprise a location proximate to the geographic area. A transmission scheme may be determined for a broadcast transmission to wireless devices proximate to the geographic area based on the first broadcast classification, where the transmission scheme may comprise a least a modulation and coding scheme. One or more access nodes may then be instructed to broadcast using the determined transmission scheme for the geographic area.

20 Claims, 7 Drawing Sheets

SYSTEMS AND METHODS FOR DETERMINING BROADCAST PARAMETERS FOR AN AREA

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a broadcast transmission may be leveraged to reach a plurality of wireless devices. For example, where a number of wireless devices request or subscribe to a transmission, the transmission may be broadcasted to conserve system resources. Here, determining broadcast parameters for the transmission may enhance the user experience for the wireless devices that receive the broadcast.

OVERVIEW

Systems and methods are described for determining a broadcast transmission scheme for an area. Channel quality indicators may be received from a plurality of wireless devices. For each of the plurality of wireless devices, a location may be determined. A geographic area may be classified as a first broadcast classification based on the channel quality indicators received from wireless devices that comprise a location proximate to the geographic area. A transmission scheme may be determined for a broadcast transmission to wireless devices proximate to the geographic area based on the first broadcast classification, where the transmission scheme may comprise a least a modulation and coding scheme. One or more access nodes may then be instructed to broadcast using the determined transmission scheme for the geographic area.

DETAILED DESCRIPTION

Figure 1:
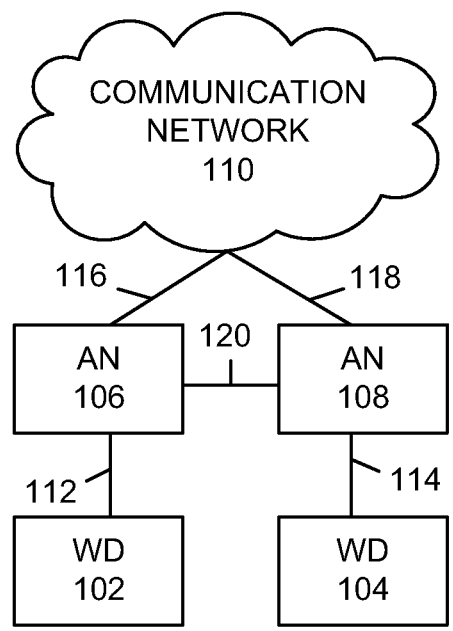
FIG. 1 illustrates an exemplary communication system to determine a transmission scheme for a broadcast.

FIG. 1 illustrates an exemplary communication system 100 to determine broadcast parameters for a transmission comprising wireless devices 102 and 104, access nodes 106 and 108, communication network 110, and communication links 112, 114, 116, 118, and 120. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 106 and 108, and communication network 110 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 106 and 108, any number of wireless devices can be implemented.

Access nodes 106 and 108 are network nodes capable of providing wireless communications to wireless devices 102 and 104, and can be, for example, a base transceiver station, a radio base station, an eNodeB device, or an enhanced eNodeB device. Access nodes 106 and 108 may communicate with communication network 110 over communication links 116 and 118 respectively. Access nodes 106 and 108 may also communicate directly with each other over communication link 120.

Although only access nodes 106 and 108 are illustrated in FIG. 1, wireless devices 102 and 104 can be in communication with a plurality of access nodes and/or relay nodes. The plurality of access nodes and/or relay nodes can be associated with different networks and can support different communication protocols and radio access technologies.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, 118, and 120 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
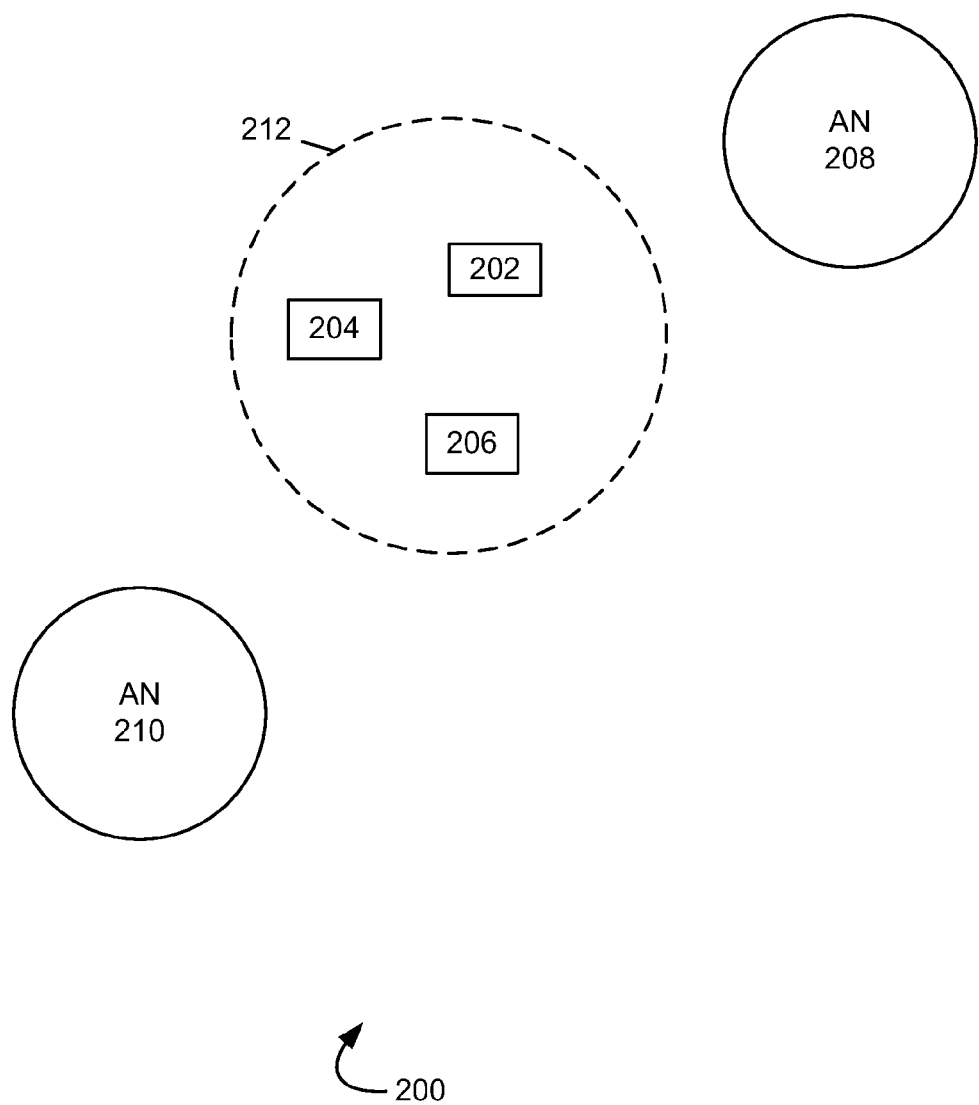
FIG. 2 illustrates another exemplary system to determine a transmission scheme for a broadcast.

FIG. 2 illustrates an exemplary communication system 200 for determining a broadcast transmission scheme for an area. System 200 comprises wireless devices 202, 204, and 206, access nodes 208 and 210, and area 212. Wireless devices 202, 204 and 206 may comprise devices similar to wireless devices 102 and 104. Access nodes 208 and 210 may comprise access nodes similar to access nodes 106 and 108.

In operation, one of access nodes 208 and 210 may establish communication with each of wireless devices 202, 204, and 206 such that the access nodes provides the wireless device access to a communication network (e.g., communication network 110). In an embodiment, system 200 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 200 may provide Multimedia Broadcast Multicast Services (MBMS). For example, system 200 may employ eMBMS, Multicast-broadcast Single Frequency Network (MBSFN), and any other suitable protocol. Here, access nodes 208 and 210 may comprise a single frequency network (SFN). For example, wireless devices 202, 204, and 206 may subscribe to a broadcast. The broadcast may be transmitted by each access node participating in the broadcast over the same frequency band, resulting in an SFN.

In an embodiment, one or more broadcasts may be transmitted by access nodes 208 and 210. For example, one or more of wireless devices 202, 204, and 206 may subscribe to a broadcast or may otherwise receive the broadcast. Area 212 may comprise a geographic area where wireless devices within the geographic area (e.g., wireless devices 202, 204 and 206) receive broadcasts. Accordingly, determining a broadcast transmission scheme based on wireless conditions for area 212 may enhance user experience for wireless devices within the geographic area.

Systems and methods are described for determining a broadcast transmission scheme for an area. Channel quality indicators may be received from a plurality of wireless devices. For each of the plurality of wireless devices, a location may be determined. A geographic area may be classified as a first broadcast classification based on the channel quality indicators received from wireless devices that comprise a location proximate to the geographic area. A transmission scheme may be determined for a broadcast transmission to wireless devices proximate to the geographic area based on the first broadcast classification, where the transmission scheme may comprise a least a modulation and coding scheme. One or more access nodes may then be instructed to broadcast using the determined transmission scheme for the geographic area.

Figure 3:
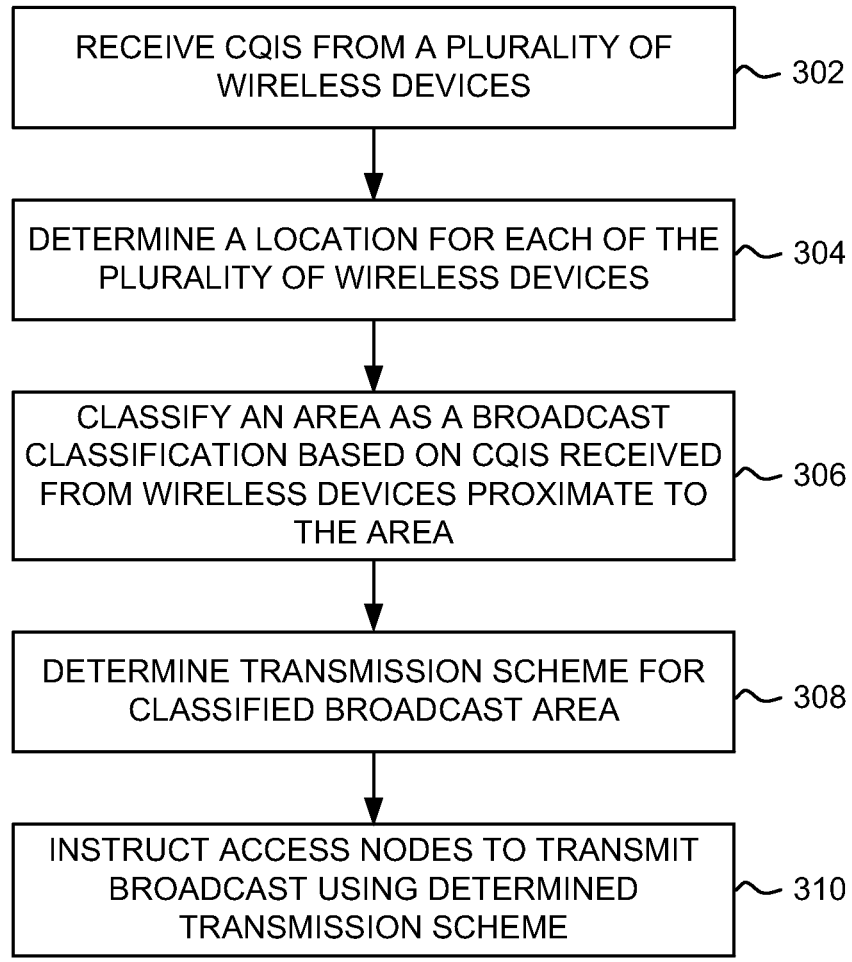
FIG. 3 illustrates an exemplary method of determining a transmission scheme for a broadcast.

FIG. 3 illustrates an exemplary method for determining a broadcast transmission scheme for an area. The method will be discussed with reference to the exemplary communication system 200 illustrated in FIG. 2, however, the method can be implemented with any suitable communication system.

Referring to FIG. 3, at step 302, a plurality of channel quality indicators may be received from a plurality of wireless devices. For example, one of access nodes 208 and 210 may receive channel quality indicators (CQIs) from each of wireless devices 202, 204, and 206. A CQI may indicate a channel quality (e.g., wireless channel quality) for a wireless device. The CQIs may be received during unicasting (e.g., not during broadcasting). In an embodiment, the CQI may comprise a number (e.g., between 1 and 30) that may be based on a signal to interference plus noise ratio (SINR) for a signal received at the wireless devices (e.g., a references signal).

At step 304, a location may be determined for each of the plurality of wireless devices. For example, a location may be determined for wireless devices 202, 204, and 206. The location may be determined based on the received CQI, a global positioning system (GPS), a determined mobility, signal triangulation (e.g., using signal levels detected at the wireless device from multiple access nodes), and the like.

At step 306, an area may be classified as a first broadcast classification based on the channel quality indicators received for wireless devices that comprise a location proximate to the area. For example, area 212 may comprise a geographic area. Wireless devices 202, 204, and 206 may comprise locations proximate to area 212. Based on the received CQIs for wireless devices 202, 204, and 206, area 212 may be classified as a first broadcast classification.

In an embodiment, area 212 may be classified as a first broadcast classification when the CQIs received from wireless devices proximate to area 212 meet a first criteria. For example, where CQIs received from wireless devices 202, 204, and 206 meet a first criteria (e.g., threshold CQI), area 212 may be classified as a first broadcast classification. In another example, area 212 may be classified as a first broadcast classification when a threshold percentage (e.g., greater than or equal to 50%, 60%, 70%, or the like) of CQIs from wireless devices that comprise a location proximate to area 212 meet a first criteria (e.g., threshold CQI).

At step 308, a transmission scheme for a broadcast transmission to wireless devices proximate to the geographic area may be determined based on the first broadcast classification. For example, a transmission scheme to wireless devices proximate to area 212 (e.g., wireless devices 202, 204, and 206) may be determined based on the first broadcast classification. In an embodiment, the transmission scheme may comprise a least a modulation and coding scheme (e.g., quadrature phase shift keying (QPSK), 8 bit quadrature amplitude modulation (QAM), 16 bit QAM, 32 bit QAM, 64 bit QAM, and the like).

At step 310, one or more access nodes may be instructed to transmit the broadcast using the determined transmission scheme for the area. For example, access nodes 208 and 210 may be instructed to transmit a broadcast to area 212 using the determined transmission scheme. Subsequently, access nodes 208 and 210 may transmit a broadcast to area 212 (e.g., wireless devices located in the area) using the determined transmission scheme.

Figure 4:
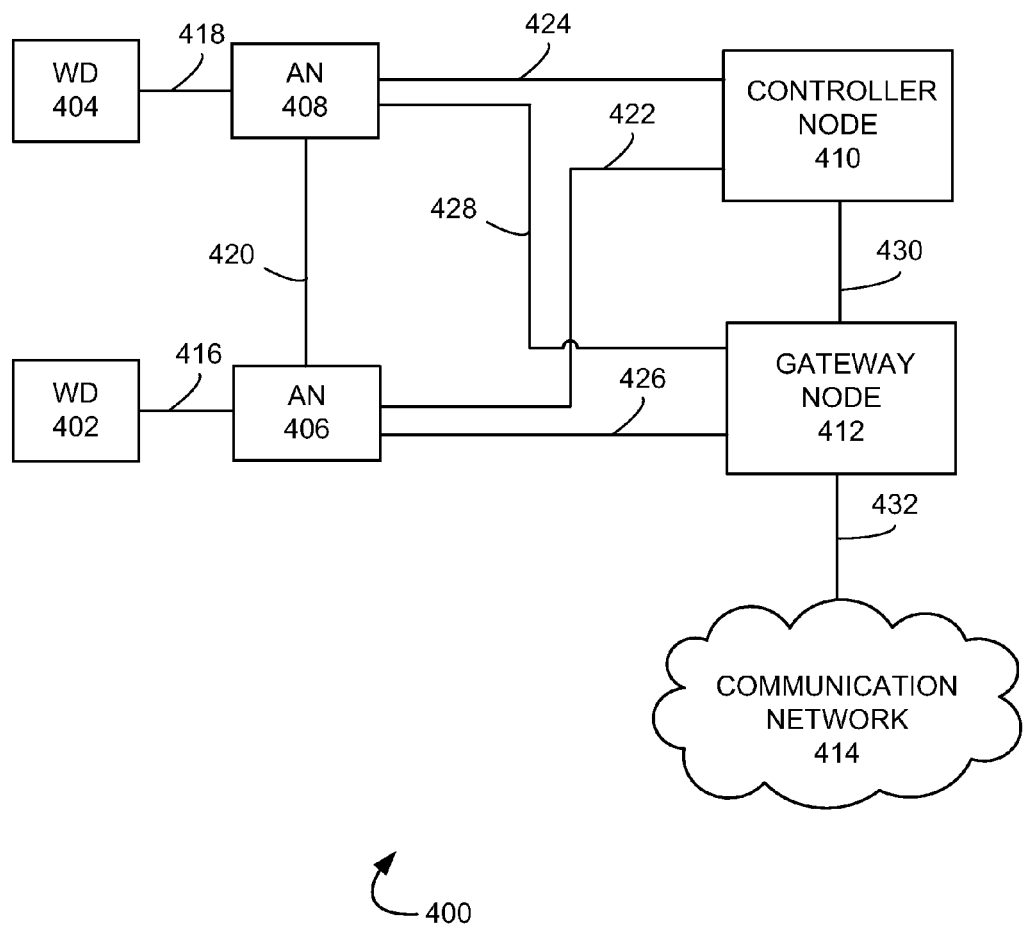
FIG. 4 illustrates another exemplary system to determine a transmission scheme for a broadcast.

FIG. 4 illustrates another exemplary communication system 400 to determine a broadcast transmission scheme for an area. Communication system 400 may comprise a wireless devices 402 and 404, access nodes 406 and 408, controller node 410, gateway node 412, communication network 414, and communication links 416, 418, 420, 422, 424, 426, 428, 430, and 432. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any device configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access nodes 406 and 408 are network nodes capable of providing wireless communications to wireless devices 402 and 404, and can be, for example, a base transceiver station, a radio base station, an eNodeB device, or an enhanced eNodeB device. In an embodiment, access nodes 406 can comprise a serving access node for wireless device 402 and access node 408 can comprise a serving access node for wireless device 404. Access nodes 406 and 408 may communicate with controller node 410 over communication links 422 and 424, respectively, and with gateway node 412 over communication links 426 and 428, respectively. Access nodes 406 and 408 may also communicate directly with each other over communication link 420.

Controller node 410 can be any network node configured to manage services within system 400. Controller node 410 may provide other control and management functions for system 400. The controller node 410 can be a single device having various functions or a plurality of devices having differing functions. For example, controller node 410 can include at least one of a multi-cell/multicast coordination entity (MCE), a mobility management entity (MME), a radio network controller (RNC), a mobile switching center (MSC), and a combination thereof.

Controller node 410 can comprise a processor and associated circuitry to execute or direct the execution of computer-readable instructions to obtain information. Controller node 410 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 410 can receive instructions and other input at a user interface. Controller node 410 can comprise a processor and associated circuitry to execute or direct the execution of computer-readable instructions to obtain information.

Gateway node 412 is a network element which can comprise a processor and associated circuitry to execute or direct the execution of computer-readable instructions. Gateway node 412 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 412 can provide instructions to access nodes 406 and 408 related to channel selection in communications with wireless devices 402 and 404. For example, gateway node 412 can comprise at least one of a serving gateway (SGW), a packet data network gateway (PDNGW), a cellular gateway (CGW), and a combination thereof.

Communication network 414 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 414 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 414 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 416, 418, 420, 422, 424, 426, 428, 430, and 432 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 406 and 408, controller node 410, gateway node 412, and communication network 414 which are omitted for clarity, including additional processing nodes, routers, gateways, and physical and/or wireless data links for carrying data among the various network elements.

Figure 6:
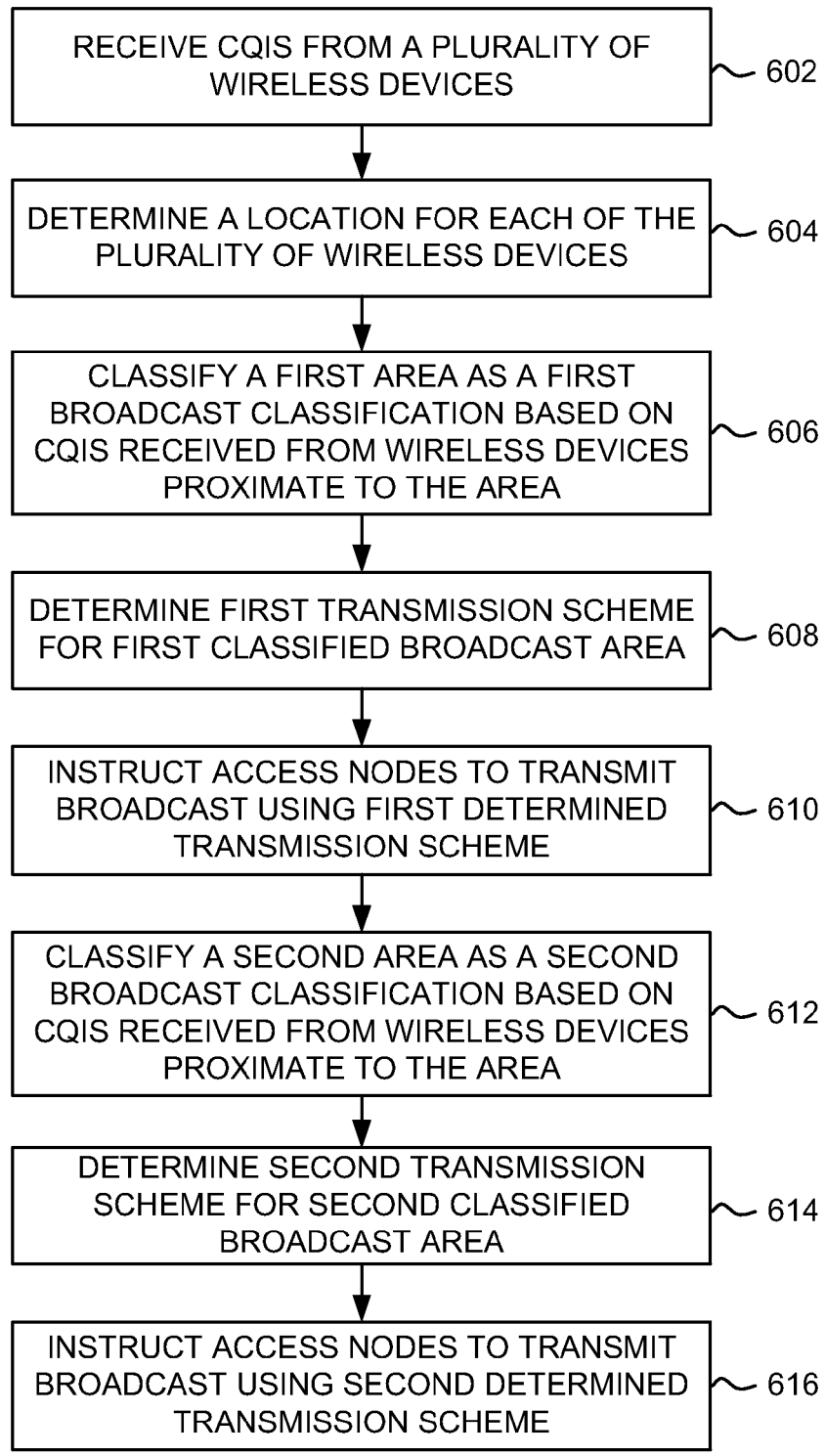
FIG. 6 illustrates another exemplary method of determining a transmission scheme for a broadcast.

In an embodiment, any of controller node 410, gateway node 412, and one or more modules of access nodes 406 and/or 408 may perform all or parts of the methods of FIGS. 3 and 6.

Figure 5:
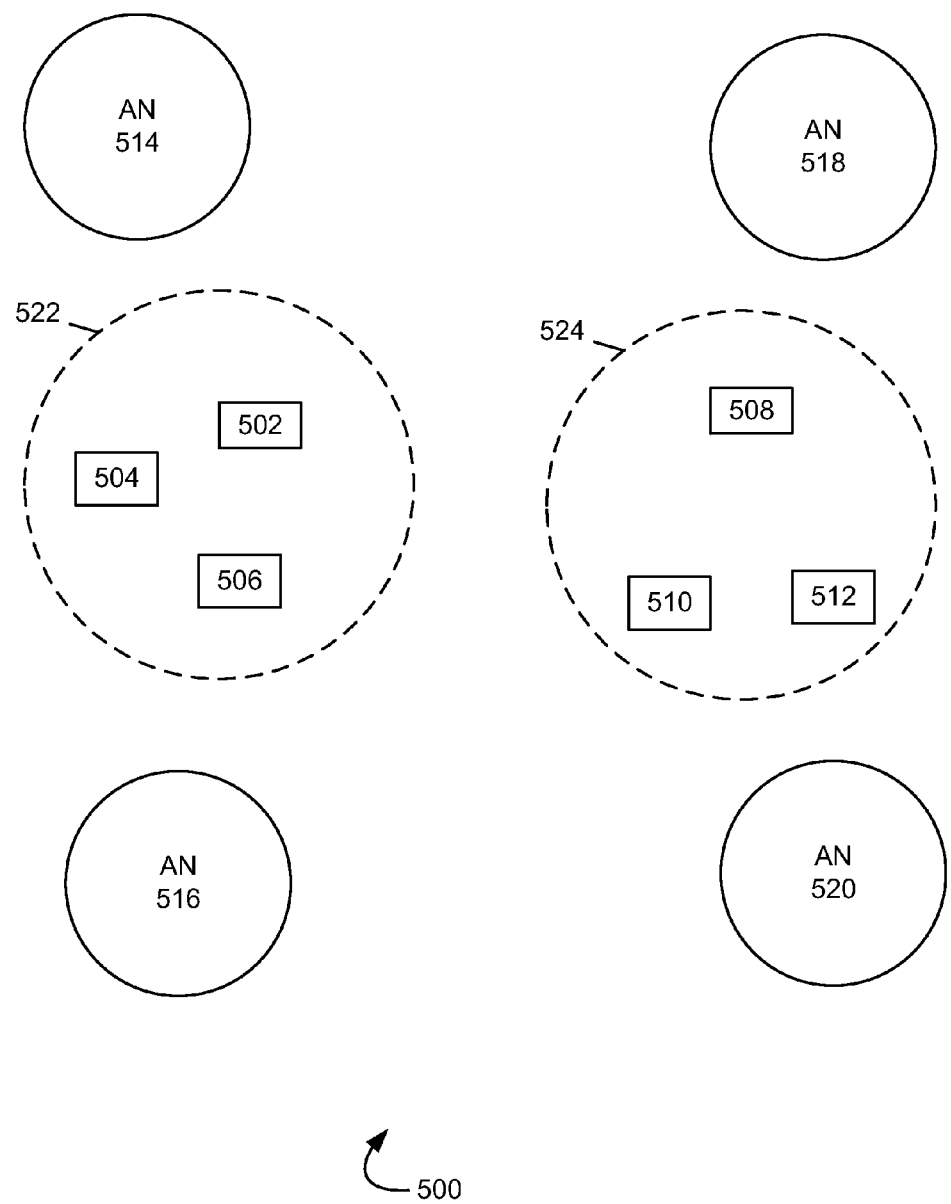
FIG. 5 illustrates another exemplary system to determine a transmission scheme for a broadcast.

FIG. 5 illustrates an exemplary communication system 500 for determining a broadcast transmission scheme for an area. System 500 comprises wireless devices 502, 504, 506, 508, 510, and 512, access nodes 514, 516, 518, and 520, and areas 522 and 524. Wireless devices 502, 504, 506, 508, 510, and 512 may comprise devices similar to wireless devices 402 and 404. Access nodes 514, 516, 518, and 520 may comprise access nodes similar to access nodes 406 and 408.

In operation, one of access nodes 514, 516, 518, and 520 may establish communication with each of wireless devices 502, 504, 506, 508, 510, and 512 such that the access nodes provides the wireless device access to a communication network (e.g., communication network 414). In an embodiment, system 500 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 500 may provide Multimedia Broadcast Multicast Services (MBMS). For example, system 500 may employ eMBMS, Multicast-broadcast Single Frequency Network (MBSFN), and any other suitable protocol. Here, two or more of access nodes 514, 516, 518, and 520 may comprise a single frequency network (SFN). For example, a subset of wireless devices 502, 504, 506, 508, 510, and 512 may subscribe to a broadcast. The broadcast may be transmitted by each access node participating in the broadcast over the same frequency band, resulting in an SFN.

In an embodiment, one or more broadcasts may be transmitted by access nodes 514, 516, 518, and 520. For example, one or more of wireless devices 502, 504, and 506 may subscribe to a broadcast or may otherwise receive the broadcast. Area 522 may comprise a geographic area where wireless devices within the geographic area (e.g., wireless devices 502, 504, and 506) receive broadcasts. Here, access nodes 514 and 516 may transmit a broadcast to area 522 such that one or more of wireless devices 502, 506, and 506 may receive the broadcast.

In another example, one or more of wireless devices 508, 510, and 512 may subscribe to a broadcast or may otherwise receive the broadcast. Area 524 may comprise a geographic area where wireless devices within the geographic area (e.g., wireless devices 508, 510, and 512) receive broadcasts. Here, access nodes 518 and 520 may transmit a broadcast to area 524 such that one or more of wireless devices 508, 510, and 512 may receive the broadcast. Accordingly, determining a broadcast transmission scheme based on wireless conditions for an area (e.g., a geographic area) may enhance user experience for wireless devices within the geographic area.

FIG. 6 illustrates an exemplary method for determining a broadcast transmission scheme for an area. The method will be discussed with reference to the exemplary communication system 500 illustrated in FIG. 5, however, the method can be implemented with any suitable communication system.

Referring to FIG. 6, at step 602, a plurality of channel quality indicators may be received from a plurality of wireless devices. For example, one of access nodes 514, 516, 518 and 520 may receive channel quality indicators (CQIs) from each of wireless devices 502, 504, 506, 508, 510, and 512. A CQI may indicate a channel quality (e.g., wireless channel quality) for a wireless device. The CQIs may be received during unicasting (e.g., not during broadcasting). For example, a CQI may be reported by a wireless device to the respective serving access node for the wireless device in a measurement report that includes the CQI. In an embodiment, the CQI may comprise a number (e.g., between 1 and 30) that may be based on a signal to interference plus noise ratio (SINR) for a signal received at the wireless devices (e.g., a references signal from the serving access node).

At step 604, a location may be determined for each of the plurality of wireless devices. For example, a location may be determined for wireless devices 502, 504, 506, 508, 510, and 512. The location may be determined based on the received CQI, a global positioning system (GPS), a determined mobility, signal triangulation (e.g., using signal levels detected at the wireless device from multiple access nodes), and the like.

In an embodiment, the wireless devices may communicate with a GPS system, and the GPS system may be used to determine a location for each wireless device. In another embodiment, a CQI for a wireless device may indicate a distance from the servicing access node. Accordingly, based on the CQI and other data (e.g., a sector for the serving access node, historic data about CQI measurements and associated determined locations, and the like) a location may be determined for a wireless device. In another embodiment, signal triangulation may be used to determine a location. For example, a wireless device may receive signals from a plurality of access nodes (e.g. reference signals) at different signal levels. Based on the received signal levels, a distance from each access node may be determined. Accordingly, using the determined distances from each access node, a location may be determined for the wireless device.

At step 606, an area may be classified as a first broadcast classification based on the channel quality indicators received for wireless devices that comprise a location proximate to the area. For example, area 522 may comprise a geographic area. Wireless devices 502, 504, and 506 may comprise locations proximate to area 522. Based on the received CQIs for wireless devices 502, 504, and 506, area 522 may be classified as a first broadcast classification.

In an embodiment, area 522 may be classified as a first broadcast classification when the CQIs received from wireless devices proximate to area 522 meet a first criteria. For example, where CQIs received from wireless devices 502, 504, and 506 meet a first criteria (e.g., threshold CQI), area 522 may be classified as a first broadcast classification. In another example, area 522 may be classified as a first broadcast classification when a threshold percentage (e.g., greater than or equal to 50%, 60%, 70%, or the like) of CQIs from wireless devices that comprise a location proximate to area 522 meet a first criteria (e.g., threshold CQI). In an embodiment, the first criteria may comprise a range of CQIs (e.g., floor threshold and ceiling threshold). Here, a CQI for a wireless device may meet the first criteria when the CQI falls within the range.

In an embodiment, where CQIs received from wireless devices 502, 504, and 506 meet a second criteria (e.g., threshold CQI), area 522 may be classified as a second broadcast classification. For example, area 522 may be classified as a second broadcast classification when a threshold percentage (e.g., greater than or equal to 50%, 60%, 70%, or the like) of CQIs from wireless devices that comprise a location proximate to area 522 meet a second criteria (e.g., threshold CQI). In an embodiment, the second criteria may comprise a range of CQIs (e.g., floor threshold and ceiling threshold). Here, a CQI for a wireless device may meet the second criteria when the CQI falls within the range. In an embodiment, the first criteria (e.g., threshold CQI) may be greater than the second criteria (e.g., threshold CQI) or the range of the first criteria (e.g., floor threshold and ceiling threshold) may be different from the range of the second criteria.

In an embodiment, area 522 may be classified as a first broadcast classification based on CQIs received from wireless devices proximate to area 522 over a period of time. For example, the CQIs received from wireless devices proximate to area 522 may be tracked over a period of time. The period of time may comprise hours, days, months, and the like. In an embodiment, wireless devices 502, 504, and 506 may be mobile throughout the period of time. Accordingly, when wireless devices 502, 504, and 506 are proximate to area 522 within the period of time, the CQIs received from the wireless devices may be tracked. Other wireless devices (not depicted) may also be mobile over the period of time, and CQIs received from these wireless devices when they are proximate to area 522 over the period of time may also be tracked.

In an embodiment, the tracked CQIs may be compared to a criteria. For example, where the tracked CQIs meet a first criteria (e.g., threshold CQI), area 522 may be classified as a first broadcast classification. In another example, area 522 may be classified as a first broadcast classification when a threshold percentage (e.g., greater than or equal to 50%, 60%, 70%, or the like) of the tracked CQIs meet a first criteria (e.g., threshold CQI). In an embodiment, where the tracked CQIs meet a second criteria (e.g., threshold CQI), area 522 may be classified as a second broadcast classification. For example, area 522 may be classified as a second broadcast classification when a threshold percentage (e.g., greater than or equal to 50%, 60%, 70%, or the like) of the tracked CQIs meet a second criteria (e.g., threshold CQI).

In an embodiment, a wireless device may be proximate to area 522 when the wireless device is within a geographic region (e.g., within boundaries of a geographic region) associated with area 522. The geographic region may be determined based on historic locations for wireless devices. For example, locations for wireless devices may be determined, and these locations may be tracked. Based on the historic locations, boundaries for a geographic region may be created. For example, boundaries for the geographic region may be created such that a threshold number of historic locations for wireless devices fall within the boundaries. In an embodiment, the geographic region may be determined based on historic locations for wireless devices that receive a broadcast transmission. For example, locations for wireless devices that receive a broadcast transmission may be determined, and these locations may be tracked. Based on the historic locations, boundaries for a geographic region may be created. For example, boundaries for the geographic region may be created such that a threshold number of historic locations for wireless devices that receive a broadcast transmission fall within the boundaries.

In an embodiment, the geographic region may be determined based on locations for access nodes. For example, where a number of access nodes are within a threshold distance from one another, boundaries for the geographic region may be created such that the geographic region encompasses the access nodes.

At step 608, a transmission scheme for a broadcast transmission to wireless devices proximate to the geographic area may be determined based on the first broadcast classification. For example, a transmission scheme to wireless devices proximate to area 522 (e.g., wireless devices 502, 504, and 506) may be determined based on the first broadcast classification. In an embodiment, the transmission scheme may comprise a least a modulation and coding scheme (e.g., quadrature phase shift keying (QPSK), 8 bit quadrature amplitude modulation (QAM), 16 bit QAM, 32 bit QAM, 64 bit QAM, and the like).

In an embodiment, a transmission scheme for the first broadcast classification may be determined based on the first criteria. For example, the determined transmission scheme may be based on a threshold CQI for the first criteria. The transmission scheme may comprise a combination of a modulation and coding scheme (e.g., QPSK, 8QAM, 16QAM, 32QAM, 64QAM, and the like) and a bit rate. A bit rate may indicate a number of redundant bits in a transmission (e.g., number of redundant bits used for error correction at the receiver, and the like). Here, the combination of the modulation and coding scheme and the bit rate may comprise a spectral efficiency for the transmission. In an embodiment, a spectral efficiency may be selected for the transmission based on the threshold CQI for the first criteria. For example, a table, such as the 4-bit CQI mapping table for LTE transmissions, may specify a particular modulation and coding scheme and bit rate combination for a particular CQI (e.g., 4-bit CQI). Accordingly, a modulation and coding scheme and bit rate combination for the first broadcast classification may be based on the first criteria (e.g., threshold CQI for the first criteria). In an embodiment, a modulation and coding scheme and bit rate combination for the first broadcast classification may be based on the first criteria, where the first criteria comprises a CQI range, and the modulation and coding scheme and bit rate combination are based on one of a ceiling CQI threshold or a floor CQI threshold for the first criteria.

At step 610, one or more access nodes may be instructed to transmit the broadcast using the determined transmission scheme for the area. For example, access nodes 514 and 516 may be instructed to transmit a broadcast to area 522 using the determined transmission scheme. Subsequently, access nodes 514 and 516 may transmit a broadcast to area 522 (e.g., wireless devices located in the area) using the determined transmission scheme.

In an embodiment, access nodes that comprise a signal coverage that overlaps with area 522 may be instructed to transmit a broadcast using the determined transmission scheme. A signal coverage for an access node may comprise an area around an access node such that wireless signals may be communicated between the access node and wireless devices that are located in the area. Here, access nodes 514 and 516 may comprise a signal coverage that overlaps with area 522.

In an embodiment, the access nodes may be instructed to transmit the broadcast using the determined transmission scheme to wireless devices in the area that comprise a CQI that meets the first criteria. For example, the first criteria may comprise a threshold CQI. Access nodes 514 and 516 may be instructed to transmit the broadcast to wireless devices proximate to area 522 (e.g., wireless devices located within area 522) when a CQI received from the wireless devices meets the threshold CQI for the first criteria. Here, wireless devices 502 and 504 may comprise a CQI that meets the threshold CQI for the first criteria, however wireless device 506 may not comprise a CQI that meets the threshold criteria. Accordingly, access nodes 514 and 516 may transmit the broadcast to wireless devices 502 and 504, however may not transmit the broadcast to wireless device 506.

At step 612, a second area may be classified as a second broadcast classification based on the channel quality indicators received for wireless devices that comprise a location proximate to the area. For example, area 524 may comprise a geographic area. Wireless devices 508, 510, and 512 may comprise locations proximate to area 524. Based on the received CQIs for wireless devices 508, 510, and 512, area 524 may be classified as a second broadcast classification. Additionally, N multiple areas may be classified as N different broadcast classifications throughout the network.

In an embodiment, area 524 may be classified as a second broadcast classification when the CQIs received from wireless devices proximate to area 524 meet a second criteria. For example, area 524 may be classified as a second broadcast classification when a threshold percentage (e.g., greater than or equal to 50%, 60%, 70%, or the like) of CQIs from wireless devices that comprise a location proximate to area 524 meet a second criteria (e.g., threshold CQI). In an embodiment, the second criteria may comprise a range of CQIs (e.g., floor threshold and ceiling threshold). Here, a CQI for a wireless device may meet the second criteria when the CQI falls within the range. In an embodiment, the first criteria (e.g., threshold CQI) may be greater than the second criteria (e.g., threshold CQI) or the range of the first criteria (e.g., floor threshold and ceiling threshold) may be different from the range of the second criteria.

In an embodiment, area 524 may be classified as a second broadcast classification based on CQIs received from wireless devices proximate to area 524 over a period of time. For example, the CQIs received from wireless devices proximate to area 524 may be tracked over a period of time. The period of time may comprise hours, days, months, and the like. In an embodiment, wireless devices 508, 510, and 512 may be mobile throughout the period of time. Accordingly, when wireless devices 508, 510, and 512 are proximate to area 524 within the period of time, the CQIs received from the wireless devices may be tracked. Other wireless devices (not depicted) may also be mobile over the period of time, and CQIs received from these wireless devices when they are proximate to area 524 over the period of time may also be tracked.

In an embodiment, the tracked CQIs may be compared to the second criteria. For example, where the tracked CQIs meet a second criteria (e.g., threshold CQI), area 524 may be classified as a second broadcast classification. In another example, area 524 may be classified as a second broadcast classification when a threshold percentage (e.g., greater than or equal to 50%, 60%, 70%, or the like) of the tracked CQIs meet a second criteria (e.g., threshold CQI).

In an embodiment, a wireless device may be proximate to area 524 when the wireless device is within a geographic region (e.g., within boundaries of a geographic region) associated with area 524. The geographic region may be determined based on historic locations for wireless devices. For example, locations for wireless devices may be determined, and these locations may be tracked. Based on the historic locations, boundaries for a geographic region may be created. For example, boundaries for the geographic region may be created such that a threshold number of historic locations for wireless devices fall within the boundaries. In an embodiment, the geographic region may be determined based on historic locations for wireless devices that receive a broadcast transmission. For example, locations for wireless devices that receive a broadcast transmission may be determined, and these locations may be tracked. Based on the historic locations, boundaries for a geographic region may be created. For example, boundaries for the geographic region may be created such that a threshold number of historic locations for wireless devices that receive a broadcast transmission fall within the boundaries.

In an embodiment, the geographic region may be determined based on locations for access nodes. For example, where a number of access nodes are within a threshold distance from one another, boundaries for the geographic region may be created such that the geographic region encompasses the access nodes.

At step 614, a second transmission scheme for a broadcast transmission to wireless devices proximate to the geographic area may be determined based on the second broadcast classification. For example, a transmission scheme to wireless devices proximate to area 524 (e.g., wireless devices 508, 510, and 512) may be determined based on the second broadcast classification. In an embodiment, the second transmission scheme may comprise a least a modulation and coding scheme (e.g., quadrature phase shift keying (QPSK), 8 bit quadrature amplitude modulation (QAM), 16 bit QAM, 32 bit QAM, 64 bit QAM, and the like).

In an embodiment, a second transmission scheme for the second broadcast classification may then be determined based on the second criteria. For example, the determined second transmission scheme may be based on a threshold CQI for the second criteria. The second transmission scheme may comprise a combination of a modulation and coding scheme (e.g., QPSK, 8QAM, 16QAM, 32QAM, 64QAM, and the like) and a bit rate. Here, the combination of the modulation and coding scheme and the bit rate may comprise a spectral efficiency for the transmission. In an embodiment, a spectral efficiency may be selected for the transmission based on the threshold CQI for the second criteria. For example, a table, such as the 4-bit CQI mapping table for LTE transmissions, may specify a particular modulation and coding scheme and bit rate combination for a particular CQI (e.g., 4-bit CQI). Accordingly, a modulation and coding scheme and bit rate combination for the second broadcast classification may be based on the second criteria (e.g., threshold CQI for the second criteria). In an embodiment, a modulation and coding scheme and bit rate combination for the second broadcast classification may be based on the second criteria, where the second criteria comprises a CQI range, and the modulation and coding scheme and bit rate combination are based on one of a ceiling CQI threshold or a floor CQI threshold for the second criteria.

At step 616, one or more access nodes may be instructed to transmit the broadcast using the determined second transmission scheme for the area. For example, access nodes 518 and 520 may be instructed to transmit a broadcast to area 524 using the determined second transmission scheme. Subsequently, access nodes 518 and 520 may transmit a broadcast to area 524 (e.g., wireless devices located in the area) using the determined second transmission scheme. Further, one or more access nodes may be instructed to broadcast N transmission schemes depending on the number of N broadcast areas determined.

In an embodiment, access nodes that comprise a signal coverage that overlaps with area 524 may be instructed to transmit a broadcast using the determined second transmission scheme. Here, access nodes 518 and 520 may comprise a signal coverage that overlaps with area 524.

In an embodiment, the access nodes may be instructed to transmit the broadcast using the determined second transmission scheme to wireless devices in the area that comprise a CQI that meets the second criteria. For example, the second criteria may comprise a threshold CQI. Access nodes 518 and 520 may be instructed to transmit the broadcast to wireless devices proximate to area 524 (e.g., wireless devices located within area 524) when a CQI received from the wireless devices meets the threshold CQI for the second criteria. Here, wireless devices 508 may comprise a CQI that meets the threshold CQI for the first criteria and the second criteria, wireless device 510 may comprise a CQI that meets the threshold CQI for the second criteria, and wireless device 512 may not comprise a CQI that meets the threshold criteria for the first criteria or second criteria. Accordingly, access nodes 518 and 520 may transmit the broadcast to wireless devices 508 and 510, however may not transmit the broadcast to wireless device 512.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
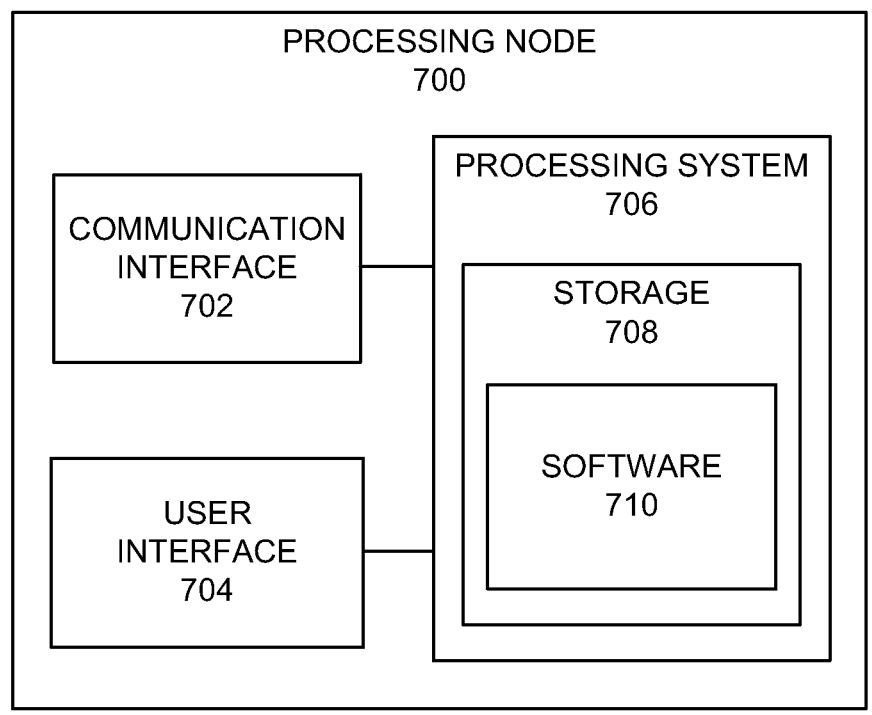
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 410 and gateway node 412. Processing node 700 can also be an adjunct or component of a network element, such as an element of access nodes 106 or 406 and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining a broadcast transmission scheme for an area, the method comprising:
   receiving channel quality indicators from a plurality of wireless devices;
   determining a location for each of the plurality of wireless devices;
   classifying a geographic area as a first broadcast classification based on the channel quality indicators received from wireless devices that comprise a location proximate to the geographic area, wherein the geographic area is defined relative to the determined locations for the wireless devices;
   determining a transmission scheme for a broadcast transmission to wireless devices proximate to the geographic area based on the first broadcast classification, the transmission scheme comprising at least a modulation and coding scheme for the broadcast transmission; and
   instructing at least two access nodes to transmit the broadcast using the determined transmission scheme for the geographic area, the geographic area overlapping signal areas for the at least two access nodes.

2. The method of claim 1, wherein classifying the geographic area as the first broadcast classification further comprises:
   tracking the channel quality indicators received from wireless devices proximate to the geographic area over a period of time; and
   determining that at least a portion of the tracked channel quality indicators meet a quality criteria.

3. The method of claim 2, wherein the determined transmission scheme for the broadcast transmission to wireless devices proximate to the geographic area is based on the quality criteria.

4. The method of claim 2, wherein the geographic area is defined relative to the determined locations for the wireless devices and relative to locations for access nodes proximate to the geographic area.

5. The method of claim 2, further comprising:
   instructing the at least two access nodes to transmit the broadcast using the determined transmission scheme to wireless devices proximate to the geographic area that comprise channel quality indicators that meet the quality criteria.

6. The method of claim 2, further comprising:
   classifying a second geographic area as a second broadcast classification based on the channel quality indicators received for wireless devices that comprise a location proximate to the second geographic area;
   determining a transmission scheme for a broadcast transmission to wireless devices proximate to the second geographic area based on the second broadcast classification, the transmission scheme comprising at least a modulation and coding scheme for the broadcast transmission; and instructing the at least two to transmit the broadcast using the determined transmission scheme for the second geographic area.

7. The method of claim 6, wherein classifying the second geographic area as the second broadcast classification further comprises:
tracking the channel quality indicators received from wireless devices proximate to the second geographic area over a period of time; and
determining that at least a portion of the tracked channel quality indicators received from wireless devices proximate to the second geographic area meet a second quality criteria.

8. The method of claim 7, wherein the second quality criteria comprises a second range of channel quality indicators between a third threshold and a fourth threshold, and the second range being different from the range.

9. The method of claim 7, further comprising:
instructing the at least two access nodes to transmit the broadcast using the determined transmission scheme for the second geographic area to wireless devices proximate to the second geographic area that comprise channel quality indicators that meet the second quality criteria.

10. The method of claim 1, further comprising tracking historic locations for wireless devices, wherein the geographic area is defined relative to the tracked historic locations.

11. A system for determining a broadcast transmission scheme for an area, the system comprising:
a processing node with a processor configured to:
receive channel quality indicators from a plurality of wireless devices;
determine a location for each of the plurality of wireless devices;
classify a geographic area as a first broadcast classification based on the channel quality indicators received from wireless devices that comprise a location proximate to the geographic area, wherein the geographic area is defined relative to the determined locations for the wireless devices;
determine a transmission scheme for a broadcast transmission to wireless devices proximate to the geographic area based on the first broadcast classification, the transmission scheme comprising at least a modulation and coding scheme for the broadcast transmission; and
instruct at least two access nodes to transmit the broadcast using the determined transmission scheme for the geographic area.

12. The system of claim 11, wherein classifying the geographic area as the first broadcast classification further comprises:
tracking the channel quality indicators received from wireless devices proximate to the geographic area over a period of time; and
determining that at least a portion of the tracked channel quality indicators meet a quality criteria.

13. The system of claim 12, wherein the determined transmission scheme for the broadcast transmission to wireless devices proximate to the geographic area is based on the quality criteria.

14. The system of claim 13, wherein the geographic area is defined relative to the determined locations for the wireless devices and relative to locations for access nodes proximate to the geographic area.

15. The system of claim 13, wherein the processing node is further configured to:
instruct the at least two access nodes to transmit the broadcast using the determined transmission scheme to wireless devices proximate to the geographic area that comprise channel quality indicators that meet the quality criteria.

16. The system of claim 13, wherein the processing node is further configured to:
classify a second geographic area as a second broadcast classification based on the channel quality indicators received for wireless devices that comprise a location proximate to the second geographic area;
determine a transmission scheme for a broadcast transmission to wireless devices proximate to the second geographic area based on the second broadcast classification, the transmission scheme comprising at least a modulation and coding scheme for the broadcast transmission; and
instruct the at least two access nodes to transmit the broadcast using the determined transmission scheme for the second geographic area.

17. The system of claim 16, wherein classifying the second geographic area as the second broadcast classification further comprises:
tracking the channel quality indicators received from wireless devices proximate to the second geographic area over a period of time; and
determining that at least a portion of the tracked channel quality indicators received from wireless devices proximate to the second geographic area meet a second quality criteria.

18. The system of claim 17, wherein the second quality criteria comprises a second range of channel quality indicators between a third threshold and a fourth threshold, and the second range being different from the range.

19. The system of claim 17, wherein the processing node is further configured to:
instruct the at least two access nodes to transmit the broadcast using the determined transmission scheme for the second geographic area to wireless devices proximate to the second geographic area that comprise channel quality indicators that meet the second quality criteria.

20. The system of claim 17, wherein the processing node is further configured to track historic locations for wireless devices, the geographic area being defined relative to the tracked historic locations.

* * * * *